United States Patent
Goldfinger

(10) Patent No.: US 6,548,622 B1
(45) Date of Patent: Apr. 15, 2003

(54) MANUFACTURE OF POLYSULFONES

(75) Inventor: Marc Bruce Goldfinger, West Chester, PA (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/937,759

(22) PCT Filed: Apr. 5, 2000

(86) PCT No.: PCT/US00/08953

§ 371 (c)(1),
(2), (4) Date: Sep. 27, 2001

(87) PCT Pub. No.: WO00/59986

PCT Pub. Date: Oct. 12, 2000

Related U.S. Application Data

(60) Provisional application No. 60/127,845, filed on Apr. 5, 1999.

(51) Int. Cl.[7] .......................... C08G 75/00; C07C 315/00
(52) U.S. Cl. ............................................ 528/171; 568/34
(58) Field of Search ..................... 568/28, 34; 528/173, 528/370, 381, 86, 90, 171

(56) References Cited

U.S. PATENT DOCUMENTS

| | | | | | |
|---|---|---|---|---|---|
| 3,819,582 | A | * | 6/1974 | Feasey ..................... | 524/104 |
| 4,094,867 | A | * | 6/1978 | Jones ......................... | 528/175 |
| 4,229,564 | A | * | 10/1980 | Dahl .......................... | 528/125 |
| 4,415,720 | A | * | 11/1983 | Rose .......................... | 528/125 |
| 5,693,740 | A | * | 12/1997 | Colquhoun et al. ......... | 528/125 |
| 6,284,137 | B1 | * | 9/2001 | Hajikano et al. ...... | 210/500.23 |

OTHER PUBLICATIONS

CA:135:46668 abs of DE19959289 Jun. 2001.*
CA:131:145315 abs of Journal of Membrane Science by Matsumoto et al 158(1–2) pp 55–62 1999.*

* cited by examiner

Primary Examiner—Jean F. Vollano

(57) ABSTRACT

Polysulfones are manufactured by reacting a sulfuric acid or sulfur trioxide with a bireactive aromatic compound, using as a "promoter" a carboxylic acid anhydride. The product polymers are useful as molding resins.

8 Claims, No Drawings

MANUFACTURE OF POLYSULFONES

This application is a 371 of PCT/US00/08953 filed Apr. 5, 2000 which claims benefit of U.S. Ser. No. 60/127,845 filed Apr. 5, 1999.

FIELD OF THE INVENTION

Polysulfones are manufactured by the carboxylicacid anhydride "promoted" reaction of sulfuric acid or sulfur trioxide with an electron rich aromatic compound which behaves as a difunctional (bireactive) compound.

TECHNICAL BACKGROUND

Polysulfones, especially aromatic polysulfones, are important engineering polymers, often having the advantages of chemical resistance, good high temperature properties, good tensile properties, and others. Typical engineering polysulfones are

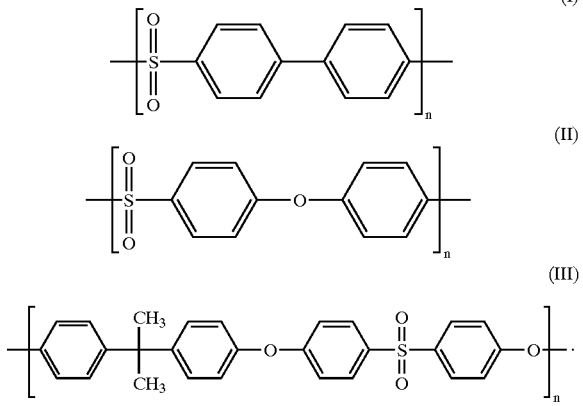

Polysulfones may be mad e using Friedel-Craots chemistry. For example, (I) is prepared by reacting 4-biphenylsulfonylchroride with a strong Lewis acid such as aluminum chloride or iron trichloroide. This method has the disadvantage of requiring stoichometric amounts of the Lewis acid catalyst. This catalyst must be removed from the polymer and be discarded or otherwise used. Alternately, polysulfones may be prepared by nucleophilic aromatic substitution chemistry. For example, (II) may be prepared by the homopolymerization of 4-chloro-4'-hydroxydiphenylsulfone, while (III) may be prepared by reaction of the disodium salt of bisphenol A with 4,4'-dichlorodiphenylsulfone. The primary disadvantage of this route is the high cost of the chloride-containing monomers. In addition, production of chloride byproducts which must be properly disposed of is also a drawback of the method.

Reported herein is a method which avoids the drawbacks of the methods described above. In this method, sulfuric acid or sulfur trioxide is reacted with a carboxylic acid anhydride to produce a bisacylsulfate, referred to hereinafter as BAS. BAS is a dielectrophile, that is, it can react twice with nucleophilic compounds. The nucleophile may be an aromatic compound which preferably is electron rich. Use of a nucleophile which can only react once will produce an aromatic sulfonic acid or a diaryl sulfone, depending on the ratio of BAS to nucleophilic aromatic compound used. See for example T. E. Tyobeka, et al., *J.C.S., Chem. Comm.* 1980, p. 114–115, and R. A. Hancock, et al., *J. Chem. Research* (S), 1980, p. 270–271. As described herein, if an aromatic nucleophile which can react twice is used it will result in a polysulfone polymer if a 1:1 ratio of the dinucleophile and BAS is used. The byproduct of the reaction is the corresponding carboxylic acid of the carboxylic anhydride. The byproduct acid may be converted back to the original anhydride which then may be recycled back into the process.

SUMMARY OF THE INVENTION

This invention concerns, a process for the production of polysulfones, comprising, contacting an aromatic compound which is bireactive, one or both of sulfuric acid and sulfur trioxide, and a carboxylic acid anhydride.

DETAILS OF THE INVENTION

By hydrocarbyl herein is meant a univalent radical containing carbon and hydrogen, while substituted hydrocarbyl means hydrocarbyl substituted with one or more functional groups (including complete replacement of the hydrogens). By hydrocarbylene is meant a divalent group containing only carbon and hydrogen containing two free valences to different carbon atoms. By hydrocarbylidene is meant a groups containing carbon and hydrogen with two free valences to the same carbon atoms, each of these valences bound to a different atom. By substituted hydrocarbylene is meant a hydrocarbylene group substituted with one or more functional groups, and in which all of the hydrogens may be replaced. It is preferred that all of these groups have 1 to 30 carbon atoms.

By a "bireactive" compound herein is meant a compound, such as an aromatic compound, in which substantially all molecules of that compound will each react twice in the sulfone forming polymerization process. Since normally the "reactive group" in such a compound is a hydrogen bound to a carbon atom, which is not usually thought of as a functional group, the term bireactive is used. If it is unknown whether a particular compound is bireactive a simple test reaction with a model compound under the appropriate reaction conditions will determine whether it is bireactive.

By an "aromatic compound which is bireactive" is meant a compound which contains at least one aromatic ring, and which is bireactive. This compound may contain more than one aromatic ring. If more than one aromatic ring is present it may be a fused ring system such as found in naphthalene or anthracene, a ring system connected directly by a covalent bond, such as is found in biphenyl, or a ring system connected through another group, such as is found in diphenyl ether, diphenylmethane, and 2,2-diphenylpropane. Other groups may be present on the aromatic rings so long as they do not interfere with the sulfone forming polymerization reaction. It is preferred that the aromatic rings are carbocyclic rings. It is also preferred that the aromatic ring or rings of this compound are naphthyl ring systems or phenyl ring(s), more preferably phenyl rings.

T. E. Tyobeka, et al., *Tetrahedron* 1988, 44(7), p. 1971–1978 postulate that the sulfone forming reaction is an electrophilic attack on an aromatic ring of the bireactive compound. It is well known in the art that in such electrophilic reactions a substrate, such as the bireactive compound, is more reactive the more "electron-rich" it is. Aromatic rings can be made more electron rich by having electron donating substituents attached to these rings. Such substituents include groups such as ether, alkyl, and tertiary amino, and are well known in the art. The presence of such groups will tend to make the bireactive compounds more reactive and ensure that it is in fact bireactive instead of monoreactive. Useful compounds for the bireactive compound include naphthalene, methylnaphthalene, methoxynaphthalene, benzyl ether, stilbene, diphenyl carbonate, benzyl phenyl ether, biphenyl, and a compound of the formula

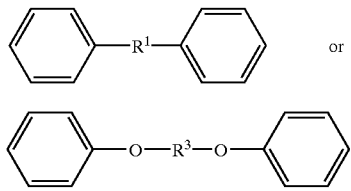

wherein $R^1$ is —O—(diphenyl ether), alkylidene (for example —$CH_2$—, —$CH_2CH_2$—, or $(CH_3)_2C<$), and $R^3$ is hydrocarbylene, substituted hydrocarbylene or hydrocarbylidene, more preferably alkylene or alkylidene. Preferred bifunctional compounds are (IV), especially when (IV) is diphenyl ether. Useful groups for $R^3$ include 1,2-ethylene, 1,3-phenylene and 1,4-phenylene. More than one bireactive aromatic compound may be present to give a copolysulfone.

Any carboxylic acid anhydride may be used. Carboxylic acid anhydride here has the usual meaning, a compound of the formula $R^2C(O)O(O)CR^2$ wherein each $R^2$ is independently hydrocarbyl or substituted hydrocarbyl. It is preferred that both of $R^2$ are the same. It is preferred that Hammett $\sigma_m$ for each of $R^2$ is about 0.2 or more, more preferably 0.4 or more. Hammett $\sigma_m$ constants are well known in the art, see for instance C. Hansch, et al., Chem. Rev., vol. 91, p. 185ff (1991). Preferred groups for $R^2$ are perfluoroalkyl, and perfluoromethyl is especially preferred.

Sulfuric acid and/or sulfur trioxide may be used as the "source" of the sulfonyl group. Particularly if sulfur trioxide is used, it may also be used to form the carboxylic acid anhydride present by dehydration of the corresponding carboxylic acid.

The molar ratio of the aromatic compound which is bireactive to the total of sulfuric acid and sulfur trioxide should preferably be about 1:1, and more preferably about 1.0:1.0, and especially preferably about 1.00:1.00, to achieve higher molecular weight polymer. This is a usual ratio for most condensation polymerizations to achieve higher molecular weight polymer. The molar ratio of carboxylic acid anhydride to sulfuric acid is preferably at least about 2:1, more preferably about 2:1 to about 4:1. The molar ratio of carboxylic acid anhydride to sulfur trioxide is at least about 1:1, preferably about 1:1 to about 2:1. The molar ratios of carboxylic acid anhydride to sulfuric acid and carboxylic acid anhydride to sulfur trioxide are not critical, but these preferred ratios make the most efficient use of the reagents.

The pressure at which the process is run is not critical, autogenous (for processes in which the boiling point of one or more of the reactants is exceeded) or atmospheric pressure being useful. In order to prevent unwanted side reactions such as hydrolysis of the carboxylic acid anhydride by atmospheric moisture, it is convenient to run the reaction under an inert atmosphere, such as nitrogen. The process may be agitated. A useful reaction temperature range is about 0° C. to about 300° C., preferably about 25° C. to about 250° C., more preferably about 30° C. to about 200° C.

The reaction may be run neat, i.e., without other added liquids or solids. It may also be run in the presence of another liquid. This liquid, which should be inert under reaction conditions, may be a solvent for one or more of the starting materials and/or product polymer, but one or more of the process ingredients may simply be suspended in the liquid. Suitable liquids includes alkanes such as octane, electron deficient aromatic compounds such as o-dichlorobenzene, nitroalkanes such as nitromethane, and halogenated alkanes such as 1,2-dichloro-ethane. The process may be run as a batch, semi-batch or continuous reaction. For example a continuous reaction may be run in a continuous stirred tank reactor or a pipeline-type reactor. Such reaction systems are well known in the art.

Aromatic compounds that are trireactive or higher may also be present in the process in small amounts (to produce a thermoplastic). Addition of these "polyfunctional" compounds will give branching, which may be desirable in the polymer for polymer processing reasons. However too much of these polyfunctional compounds will lead to crosslinking. Crosslinking is undesirable for making thermoplastic (melt processible) polymer, but may be desired if a thermoset resin is the desired product.

Included within the meaning of the ingredients added to this process are any combinations of (other) ingredients which are known to react to give the needed ingredients in situ, such as the use of sulfur trioxide to dehydrate a carboxylic acid to its anhydride, as mentioned above.

As mentioned above, the byproduct carboxylic acid derived from the carboxylic acid anhydride may be recycled back into the process by being converted back to the carboxylic anhydride. A convenient way to do this is to react it with sulfur trioxide which acts as a dehydrating agent. Other methods known in the art for converting carboxylic acids to their anhydrides may be used "outside" the polymerization process, and the "regenerated" anhydride reused in the process. The carboxylic acid byproduct, if volatile enough, may be separated from the product polysulfone (and liquid medium, if any) by volatilization/distillate on.

The polymers produced by the process are useful as molding resins for various types of parts, such as parts that are heat and/or chemically resistant.

In the Examples the instrument used for MALDI had a time-of-flight detector and was a Vision® 2000 instrument made by ThermoBioanalysis located in Santa Fe, N. Mex., U.S.A.

In the Examples the following abbreviations are used:
MALDI—Matrix Assisted Laser Desorption Ionization
RT—room temperature

EXAMPLE 1

To a 250 mL 3-neck flask equipped with a nitrogen inlet, and a reflux condenser was added 2.0 g of a 95.6% sulfuric acid (19.5 mmol) solution, 5 mL nitromethane, and 15.0 g (71.4 mmol) trifluoroacetic anhydride. The mixture was allowed to stir at RT for 15 min under a nitrogen blanket. A solution of 4.195 g (19.6 mmol) 1,2-diphenoxyethane in 15 mL 1,2-dichloroethane was then added dropwise from an addition funnel over 15 min. An additional 12 mL portion of warm 1,2-dichloroethane was added to the addition funnel to help dissolve material which had crystallized out and was then added to the reaction solution. The mixture was allowed to stir at RT for an additional 30 min before being heated to 65° C. After heating at 65° C. for 4.5 h the mixture was allowed to cool before being precipitated into a large excess of ethyl acetate. The solids were filtered, washed with fresh ethyl acetate, and dried overnight at 60° C. in a vacuum oven to afford 1.682 g (31%) of a beige solid. MALDI Mass-Spec showed a range of masses from 750–4100 g/mol, with the most intense signal at 1594 g/mol.

EXAMPLE 2

To a 100 mL Schlenk flask equipped with a nitrogen inlet was added 4.0 g of a 95.6% sulfuric acid (39.0 mmol)

solution, 10 mL nitromethane, and 30.0 g (142.8 mmol) trifluoroacetic anhydride. The mixture was allowed to stir at room temperature for 15 min under a nitrogen blanket. A solution of 6.52 g (38.3 mmol) diphenyl ether in 10 mL nitromethane was then added dropwise from an addition funnel over 15 min. The addition funnel was replaced with a condenser and the solution was stirred for 30 min at RT before being heated at 85° C. for 5.3 h. The reaction was then heated at 110° C. for an additional 1.2 h and then allowed to cool to RT. The solution was added dropwise to an excess of methanol and the solids were filtered, washed with fresh methanol, and dried overnight at 60° C. in a vacuum oven to afford 1.959 g (22%) of a beige solid. MALDI Mass-Spec showed a range of masses from 630–2500 g/mol, with the most intense signal at 1098 g/mol.

What is claimed is:

1. A process for the production of polysulfones, comprising, contacting an aromatic compound which is bireactive selected from the group consisting of naphthalene, methylnaphthalene, methoxynaphthalene, benzyl ether, stilbene, diphenyl carbonate, benzyl phenyl ether, biphenyl,

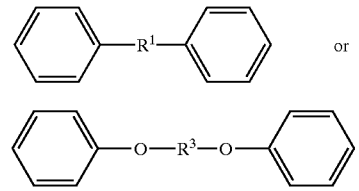

wherein $R^1$ is —O— or alkylidene, and $R^3$ is hydrocarbylene, substituted hydrocarbylene or hydrocarbylidene, a carboxylic acid anhydride; and at least one sulfonyl containing species selected from the group consisting of surfuric acid, sulfur trioxide and a mixture of surfuric acid, and sulfur trioxide, wherein the molar ratio of the aromatic compound to the total sulfonyl containing species is 1:1, and wherein the reaction temperature range is 0° C. to 300° C.

2. The process of claim 1 wherein the sulfonyl containing species comprises sulfuric acid and the molar ratio of carboxylic acid anhydride to sulfuric acid is at least 2:1.

3. The process of claim 1 wherein a reaction temperature range is 30° C. to 200° C.

4. The process of claim 1 wherein said carboxylic acid anhydride has the formula $R^2C(O)O(O)CR^2$ wherein each $R^2$ has a Hamett $\sigma_m$ constant of 0.2 or more.

5. The process of claim 4 wherein each $R^2$ is perfluoroalkyl.

6. The process of claim 3 wherein said carboxylic acid anhydride has the formula $R^2C(O)O(O)CR^2$ wherein each $R^2$ has a Hamett $\sigma_m$ constant of 0.2 or more.

7. The process of claim 1 wherein said aromatic compound which is bireactive is diphenyl ether.

8. The process of claim 1 wherein the sulfonyl containing species comprises sulfur trioxide and the molar ratio of carboxylic acid anhydride to sulfur trioxide is at least 1:1.

* * * * *